UNITED STATES PATENT OFFICE.

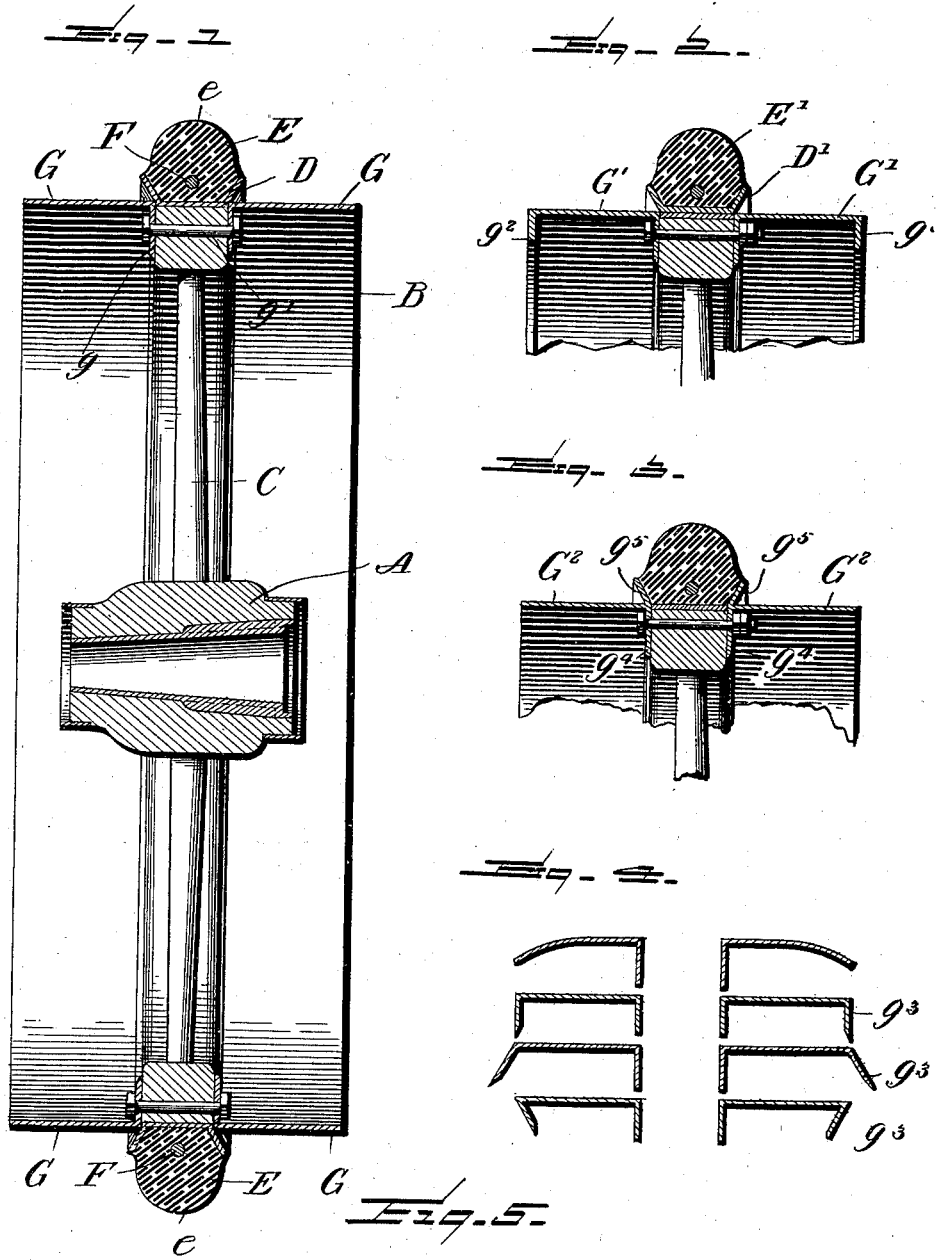
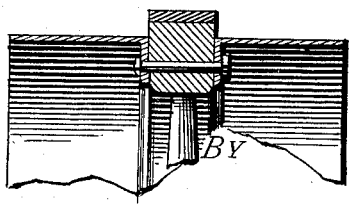

SAMUEL F. NEILL AND JULIEN E. TINKER, OF BRADFORD, PENNSYLVANIA, ASSIGNORS OF THREE-FIFTHS TO PULASKI B. BROUGHTON, SAMUEL L. RHODES, AND MOSES COHN, OF SAME PLACE.

WHEEL.

SPECIFICATION forming part of Letters Patent No. 683,220, dated September 24, 1901.

Application filed February 23, 1901. Serial No. 48,522. (No model.)

*To all whom it may concern:*

Be it known that we, SAMUEL F. NEILL and JULIEN E. TINKER, citizens of the United States, residing at Bradford, in the county of McKean and State of Pennsylvania, have invented certain new and useful Improvements in Wheels; and we do hereby declare the following to be a full, clear, and exact description of the invention, such as will enable others skilled in the art to which it appertains to make and use the same.

Our invention is an improvement in wheels for vehicles; and it consists in the novel features of construction and combination of parts hereinafter fully described, reference being had to the accompanying drawings, which illustrate one form in which we have contemplated embodying our invention and several slight modifications thereof.

Our invention is fully disclosed in the following description and claims.

Referring to the said drawings, Figure 1 represents a sectional view of a wheel embodying our invention. Fig. 2 represents a partial sectional view of a slight modification. Fig. 3 is a view similar to Fig. 2, showing another modification. Fig. 4 is a view showing cross-sections of auxiliary treads of different shapes embodying our invention. Fig. 5 is a sectional view of another modification.

The object of our invention is to provide a wheel with a lateral flange or lateral flanges forming an auxiliary tread of slightly-less diameter than the main tread of the wheel.

In the drawings, A represents the hub of a wheel, B the rim or felly, and C the spokes. The wheel is shown as constructed of wood in the ordinary manner; but the wheel may be composed entirely of metal or partly of wood and partly of metal, if preferred. The wheel may be provided with either a metal tire or a rubber or other form of cushion or yielding tire, as referred. In this instance we have shown the wheel provided with a metal tire D, (see Fig. 1,) which is grooved to retain a rubber tire E, held therein by a wire or other suitable core F, the tread of the wheel being the outer periphery of the rubber tire. (Indicated at $e$.)

G G represent annular flanges or rings, each of which is provided at one side with an inwardly-extending attaching-flange $g$, which is bolted or otherwise secured to the rim or felly of the wheel. The wheel may be supplied with one of these lateral flanges G; but we prefer to provide one on each side, the bolts $g'$ extending through the felly and through the attaching-flanges $g$ $g$. The flanges G G are of less diameter than the tread of the wheel, so that when the wheel is running over a hard road-bed it will run on the normal tread $e$; but when it runs over sandy, muddy, or other yielding road-beds it will run upon the auxiliary tread formed by the flanges G G, as the main tire E will sink into the yielding bed. The auxiliary tread prevents the wheel from sinking farther than the difference in the radii of the main and auxiliary treads, and the auxiliary tread affords a broad surface to bear up the wheel and its load and also gives increased traction, which is very desirable in the case of self-propelled vehicles.

In some instances we prefer to provide the outer edges of the auxiliary tread with inwardly-extending rims or flanges, as shown in Fig. 2, in which $G'$ $G'$ represent the lateral flanges and $g^2$ $g^2$ the outer rims or flanges thereof, which serve to largely prevent sand, mud, or water from working over the auxiliary tread, which would cause the wheel to draw hard. In Fig. 4 we have shown cross-sections of several styles of auxiliary treads provided with inwardly curved or bent flanges $g^3$ $g^3$ for this purpose.

In Fig. 3 we have shown a modified construction, in which the lateral flanges $G^2$ $G^2$ are provided with the inwardly-extending attaching-flanges $g^4$ $g^4$ and also with outwardly-extending flanges $g^5$ $g^5$, which form the lateral retaining-walls or the cushion-tire $E^2$. This construction is particularly advantageous for applying our invention to any ordinary wheel, so as to provide it with a cushioned main tread and the broad auxiliary tread.

In Fig. 5 we have shown our invention applied to an ordinary wheel having a metal tire. In this figure $B^3$ is the felly, $D^3$ the tire, and $G^3 G^3$ the lateral flanges, provided with the securing-flanges $g^6 g^6$.

What we claim, and desire to secure by Letters Patent, is—

1. The combination with a wheel, of an annular auxiliary tread of less diameter than the tread of the wheel, provided with an attaching-flange and means for securing said attaching-flange to the wheel, substantially as described.

2. The combination with a wheel, of an annular auxiliary tread on each side of the wheel of less diameter than the tread of the wheel each provided with an inwardly-extending attaching-flange adapted to be secured to the wheel, and an outwardly-extending flange, said outwardly-extending flanges forming lateral retaining-walls for the wheel-tire, substantially as described.

3. The combination with a wheel, of an annular auxiliary tread on each side of the wheel, of less diameter than the tread of the wheel, each provided with means for attaching it to the wheel, and with an inwardly-extending flange at its outer edge to prevent sand and mud from running over said auxiliary tread, substantially as described.

In testimony whereof we affix our signatures in the presence of two witnesses.

SAMUEL F. NEILL.
JULIEN E. TINKER.

Witnesses:
LUCY M. WILLIAMS,
MABEL F. WILLIAMS.